Feb. 3, 1942.  R. H. ZINKIL  2,271,850
VALVE
Filed Nov. 3, 1939  2 Sheets-Sheet 1

Inventor:
Roy H. Zinkil
By Joseph O. Lange Atty.

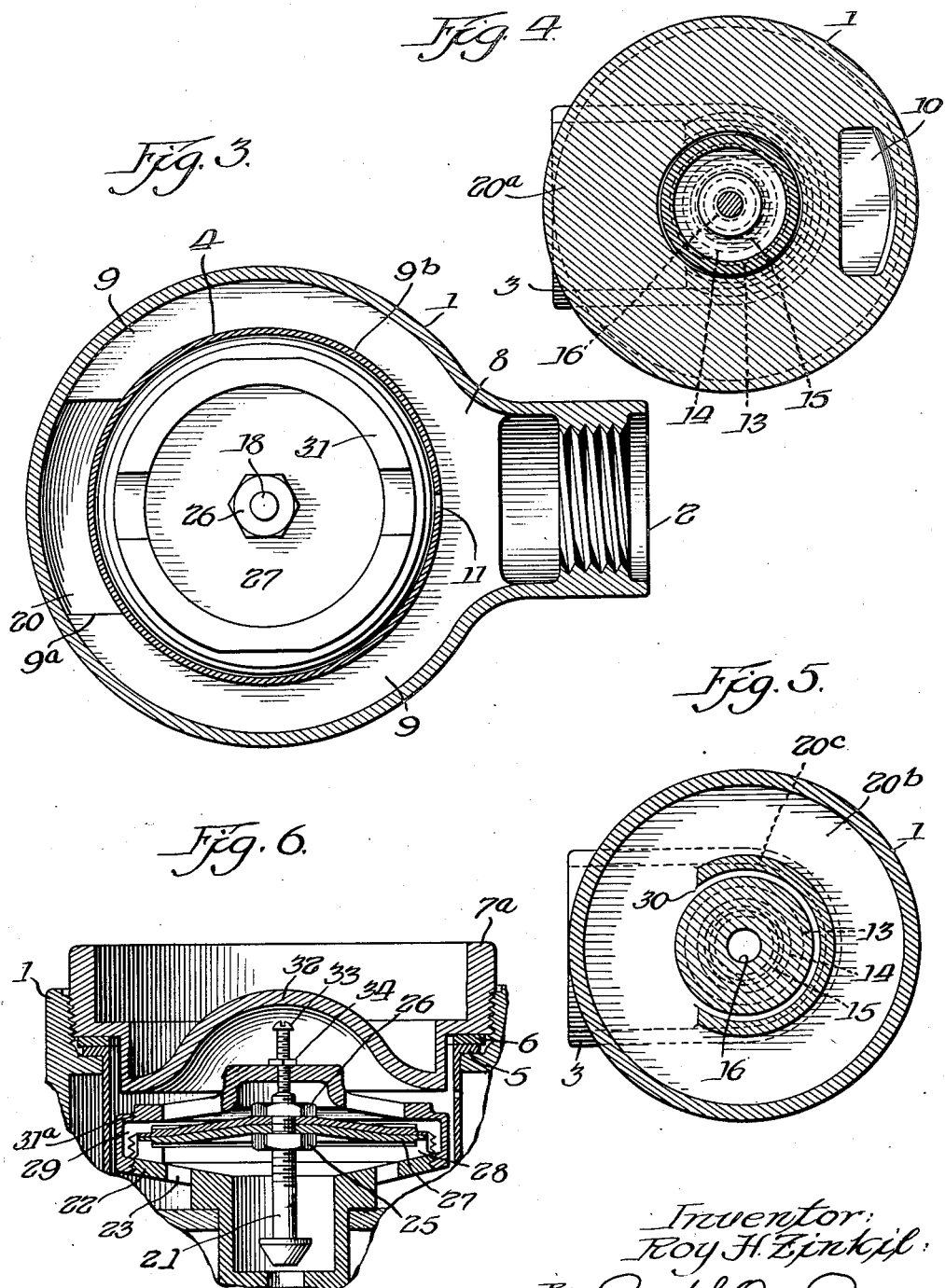

Patented Feb. 3, 1942

2,271,850

UNITED STATES PATENT OFFICE 2,271,850

VALVE

Roy H. Zinkil, Oak Park, Ill., assignor to Crane Co., Chicago, Ill., a corporation of Illinois Application November 3, 1939, Serial No. 302,648

2 Claims. (Cl. 236—93)

My invention relates to a thermostatic valve and more particularly to a compact thermostatic shut-off valve or similar device, the use of which is desirable for such installations wherein the chance for a person being burned or even scalded by uncontrolled and excessively hot water is generally present, as for example in shower baths, hydrotherapeutic treatments, and the like. Moreover, it is a principal object of my invention to provide a thermostatic valve in which there is a quick response to such dangerous high temperature conditions with what is termed a snap action and substantially positive shut-off. Further, my invention provides that the valve will close when the water temperature reaches or exceeds a predetermined point. Previous valves using a similar type of thermostatic element, to my knowledge, have been set to open if the temperature reached or exceeded a certain point.

I am aware that there have been numerous types of thermostatic control valves available in the past but, to my knowledge, these have not been altogether satisfactory because there has been a significant tendency for line pressures, as distinguished from temperatures, to influence adversely the accuracy and the desirable operation of the valve so that obviously in numerous cases such influence has rendered the valve virtually useless for the purpose intended. In contradistinction, it has been definitely determined that line pressure has extremely little influence, if any, upon the functioning of the valve exemplifying my invention.

Another serious objection to prior constructions, realizing that the usual installation is one of space limitations, has been predicated upon the fact that the thermostatic valves have been necessarily large because within the valve casing structure such elements as bellows and its accessory parts have been contained. The net result has been that frequently special provision for installing the valves has been found necessary. In distinguishing advantageously thereover, however, my invention features a valve which is relatively compact in its space requirements and which may therefore be installed close to the associated fixture without necessitating any special space requirements.

Another important advantage of my invention lies in the fact that because of providing a well directed and sufficiently large water volume to transfer heat to the thermostatic element and upon which the thermostatic element reacts, the benefit of very prompt or sensitive heat transfer to the thermostatic element has been obtained.

With more particularity, by means of baffles suitably positioned within the interior of the casing, the incoming water has been made to pursue a predetermined course of travel which is relatively closely positioned to the said element and is therefore unusually effective in its influence upon the functioning of the latter.

In addition, provision has been made in the preferred form of my invention for the use of a leaky or cut-away valve seat in the auxiliary valve so that water therewithin, after the valve has been closed, can then discharge therefrom and allow for the reopening of the thermostat, thus avoiding the objectionable or sluggish effect upon the speed of opening which might otherwise be induced by the presence of water within the valve casing.

Another advantage lies in the use of an auxiliary valve which enables the user to obtain a large volume of water without interfering with the benefits arising from the thermostatic element, since the latter is usually limited in axial movement, thus inhibiting a sufficient or adequate volume of water.

Another advantage resides in the provision of convenient adjustability of the thermostatic element for the manufacturer so that the desired range of operating temperatures, expressed in degrees, may be easily met, or inconsistencies in the manufacture of the thermostatic element may be circumvented.

Other objects and advantages of my invention will become more readily apparent upon proceeding with the following description of a preferred embodiment thereof in connection with the accompanying drawings, in which—

Fig. 3 is a sectional assembly view taken on the line 3—3 of Fig. 1.

Fig. 4 is a sectional assembly view taken on the line 4—4 of Fig. 1.

Fig. 5 is a sectional assembly view taken on the line 5—5 of Fig. 1.

Fig. 6 is a fragmentary sectional view in which there is disclosed an embodiment of one form of construction for the adjustment of the thermostatic disc or element.

Similar reference characters refer to similar parts throughout the various views.

Figure 1:
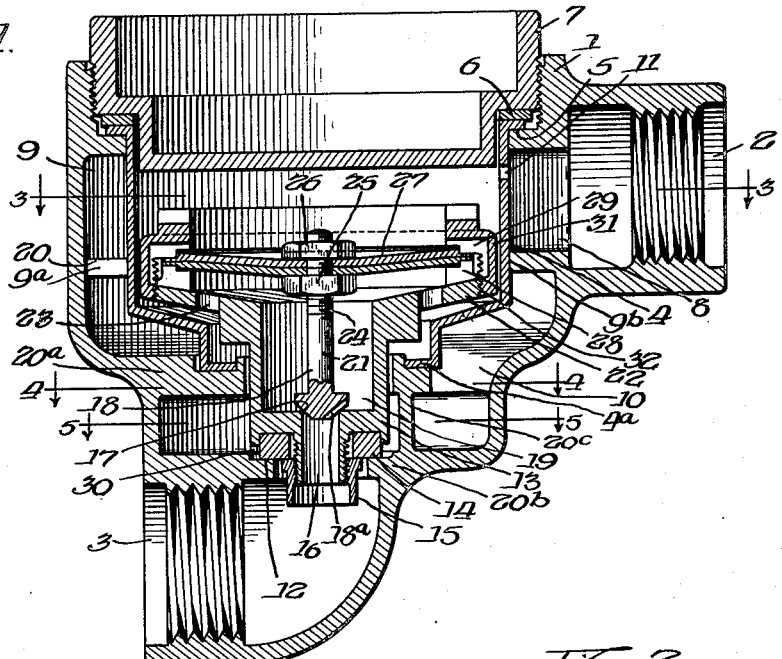
Fig. 1 is a sectional assembly view of a valve exemplifying my invention showing the auxiliary valve in its closed position and in which the main valve is likewise shown in its seated relation.

Referring now to Fig. 1, the valve proper comprises a conventional casing or body herein generally designated as 1, which is provided with the usual inlet 2 and the discharge passage or outlet 3. The inlet and outlet while here shown with tapered pipe threads may obviously have any desired connection for attachment to the pipe line (not shown).

At the outset, in order to obtain a better understanding of the structure exemplifying the applicant's invention and the principle of operation underlying its functioning, attention is directed to the fact that the casing 1 is divided, between its inlet and its outlet, into three annularly formed chambers or passages, namely, upper, middle and lower, which are partitioned respectively by the baffles 9a, 20a and the seat diaphragm 20b. This construction provides for a circulatory means to contribute better heat transfer to the thermostatic element thus enabling the line fluid flow with its temperature fluctuations to be controlled more accurately.

The casing 1 is also provided with a substantially cylindrically formed sleeve 4 which shoulders at its upper end, as at 5, and preferably employs a gasket 6 to make a pressure tight joint with the casing and the threaded cap 7. The sleeve 4 also seats at its lowermost portion within the valve casing, as indicated at 4a, thereby serving in effect as a container within the casing 1 for the other trimmings hereinafter to be described at greater length.

As more clearly shown in Fig. 3, the port 8 connecting with the inlet 2 is provided with an annular passage 9 extending completely around the sleeve 4, the latter being attached to the casing in leakproof relation as at 9b, as for example, by a sweat joint, to the annularly extending baffle 20a, which also forms thereby the lower limit of the passage 9.

The sleeve 4 is provided with the bleeder aperture 11, which serves as a by-pass to permit the entry of a sufficient volume of water from the inlet 2 to substantially fill the chamber above and immediately adjacent to the thermostatic element. The bleeder aperture 11 serves for its primary purpose to direct the water entering the inlet 2 so as to pass directly into the sleeve 4. Such arrangement thus provides for the water to actually contact directly with the thermostatic element and avoids such lag or sluggishness in the promptness of operation which might otherwise prevail, as for example, in depending upon the heat transfer obtained through the walls of the sleeve 4. Positioned within the sleeve 4 and extending through the lowermost end portion of the casing seat 20b, a hollow plunger valve 13, normally seating at 12, is provided with a conventional renewable seating member 14, the latter being held to the plunger valve 13 in the usual manner by the hollow retaining nut 15. The plunger or main valve 13 is provided with a centrally extending aperture or port 16, the upper end of which is defined by a valve seat 17 upon which the auxiliary valve 18 with its slotted contact 18a may bear. The port 16 must necessarily be sufficiently large in its cross-sectional area so as to accommodate the total volume of water admitted into the sleeve 4, so as to effectively prevent the accumulation of pressure upon the plunger valve 13 and actually cause the latter to seat. The upper portion of the main valve 13 is expanded to form a chamber 19 into which the stem 21 of the auxiliary valve extends. Peripherally extending around the upper limits of the chamber 19, an annular extension 22 is provided, the latter preferably having the holes 23 to facilitate a further improved circulation of the water within the lower portions of the sleeve 4.

At the upper end of the auxiliary stem 21, which is preferably threaded as indicated at 24, are upper and lower nuts referred to as 25 and 26 respectively, between which is interposed a bi-metallic diaphragm 27 sensitive to temperature changes and of the type disclosed in United States Patent No. 1,448,240, issued to Spencer, March 13, 1923, or the Spencer Patent No. 1,848,031, issued March 1, 1932. Obviously, however, the particular type of thermostatic element employed may be varied in form and in structure considerably from that shown without departing from the inventive concept of its application to the type of valve disclosed.

Rigidly mounted upon the shouldered projections 28 and 29, respectively part of the extension 22 and the ring 31, the diaphragm 27 is held therebetween by means of the threaded ring 31 engaging the threads 32 on the periphery of the apertured annular extension 22. Therefore, with the snap action movement characteristic of this type of thermostatic element, the auxiliary valve 18 will likewise be moved axially upon the occurrence of water temperature changes within the valve casing, moving with a predetermined satisfactory temperature of water from the closed position shown in Fig. 1 to the open position indicated in Fig. 2.

Considering possible uncertainties in the performance of the thermostatic element traceable to manufacturing variations and the like, it may frequently be desirable to provide for convenient adjustability of the amount of flexure of the said element. Accordingly in Fig. 6, means for providing such adjustability are illustrated, although of course the construction may vary considerably depending upon the construction resorted to in the type of thermostatic element used.

In this modified form, the upper threaded ring 31 to accommodate the adjustability mentioned, is modified so as to provide a centrally threaded hub portion 35 integrally mounted upon a spider construction extending radially across the ring, receiving an adjusting screw 33, fitted with a locknut 34. The cap 7a is made in hollow or concave form, as indicated at 32, to accommodate the postioning of the adjusting screw, the latter bearing against the end of the stem 21, thereby positively limiting the amount of flexure upwardly of the thermostatic element 27, and thus restraining and otherwise controlling the movement of the latter as desired in its response to the temperature changes encountered during the course of operation.

*Description of operation*

Figure 2:
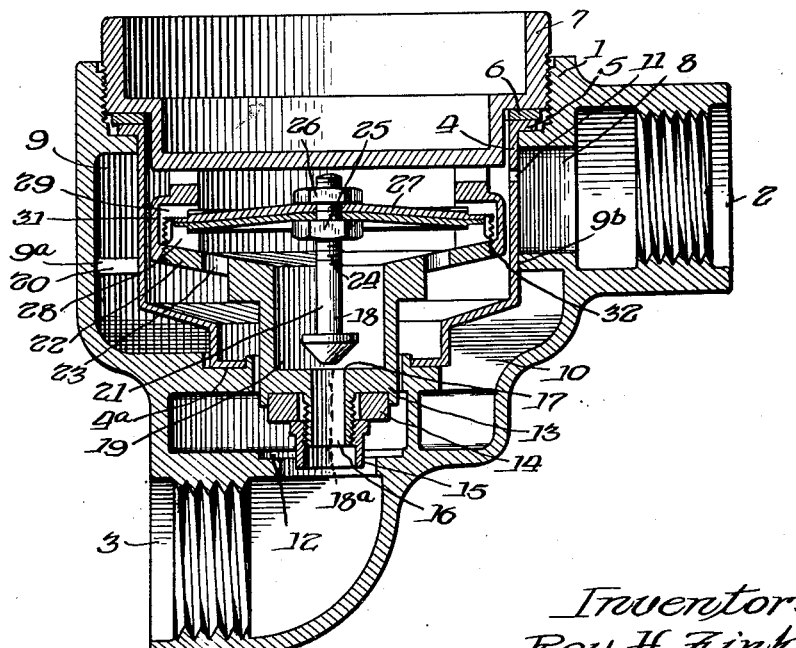
Fig. 2 is a sectional view of the assembly described in connection with Fig. 1, but in which the thermostatic element is shown open and in the opposite position from that disclosed in the latter figure, the auxiliary valve accordingly being shown as lifted from its seat. The main valve in this view also occupies a position in which it is likewise shown as lifted from its seat.

Assume that the main valve is in its normal operating position for supplying the necessary hot water to a plumbing fixture, as a shower, for example. Therefore the valve will be open as illustrated in Fig. 2. The course of water then passing through the valve will be substantially as follows: The water enters the inlet port 2, thence into the passage 8 leading to and connected with the annular port 9 surrounding a substantial portion of the outer periphery of the sleeve 4. However, because of the aperture 11 in the sleeve wall which, as indicated, is in the direct line of flow through the casing port 8, a small portion of water is by-passed from the annular port 9 and passes into the interior of the sleeve 4, thereby contacting directly with the thermostatic element 27, passing peripherally therearound between the relieved portions or annular spaces between the preferably equally spaced projections 28 and 29, and between which the thermostatic element 27 is held in position. Such positioning therefore allows only for the desired snap movement to occur at the diametral center thereof. Continuing with Fig. 2, the water will pass over both upper and lower sides of the thermostatic element 27 continuing into the chamber 19, and also circulating on the outside thereof by reason of a portion of the water within the sleeve flowing through the annularly spaced holes 23 and into the peripheral space provided between the plunger valve 13 and the inside diameter of the baffle 20a.

The water therewithin continues to flow downwardly and into the annular passage 30 (see Fig. 5) which lies immediately within the baffle 20a and is formed by the lower cylindrically formed extension which provides for the seating of the main plunger valve 13. With the plunger valve 13 in the open position shown in Fig. 2, the water will then pass into the larger annular passage above the seat diaphragm 20b, respectively past the disc 14 and the disc nut 15, through the seat opening into the valve outlet 3. At the same time the water coursing through the chamber 19 will then pass into the port 16 within the plunger valve 13 joining the water which passes over the exterior of the latter member as both courses converge within the opening of the main valve seat 12.

The foregoing description thus far applies only to the courses of the divided flow taken by the by-passed water which, as explained above, commenced its divided circulation within the sleeve 4 upon passing through the bleeder hole 11 in the wall of the sleeve 4, the size of the hole being preferably as large as possible to suit the volume requirements of the installation.

Simultaneous with the occurrence of the by-passed flow of water just described, the principal flow through the valve occurs exteriorly around the sleeve 4, pursuing a path of flow which is substantially divided and in different planes or levels. As previously stated, the joint between the sleeve 4 and the inner diameter of the baffle 9a being rendered leakproof, as for example, by use of a sweated joint, the water flowing within the annular passage 9 cannot pass below the said annularly extending baffle wall 9a except as provided through the port 20, thereby dropping into a lower plane into the midpositioned annular passage defined respectively in its upper and lower limits by the upper baffle 9a and the lower baffle 20a. Similarly, the flow of water therethrough is directed to the single outlet port 10 leading therefrom into the lower annular passage which similarly is formed between the midpositioned baffle 20a and the seating diaphragm 20b. Continuing with the main valve 13 in the open position, as shown in Fig. 2, the water then passes into the port within the valve seat 12 and out into the valve outlet 3, thus commingling the main flow through the valve as just described with the divided by-pass flow as previously described. The main valve plunger 13 is so designed and constructed so that line flow pressure acting upon the underside thereof will normally keep the valve open.

It is further provided that the volume passing through the peripheral area between the outside of the plunger valve 13 and the aperture defined by the midpositioned baffle 20a does not exceed the volume provided by the port opening 16 for the auxiliary valve.

It will be noticed that by the preferred positioning of the respective ports 20 and 10 through the upper and intermediate baffles, the water must necessarily pursue an extended course of back and forth travel within the casing which results in the beneficial effect of surrounding or jacketing the heat responsive thermostatic element 27 so that improved heat transfer is thereby provided to which the thermostatic element responds.

Assume now that the water entering the valve inlet 2 for sundry reasons has attained a temperature in excess of that desired for satisfactory performance of the fixture used in connection therewith. The thermostatic element 27 will then be promptly subjected to actual contact with the incoming hot water and accordingly will react to the extent of inverting itself from the position shown in Fig. 2, assuming the position shown in Fig. 1, which is characteristic of this type of thermostatic element. Because of such inversion of the thermostatic element, the auxiliary valve 18 will seat within the chamber 19. Immediately upon the occurrence of the latter seating of the valve, pressure within the sleeve 4 will develop, in view of the line fluid accumulating therewithin through the supply by-pass aperture 11 and the spaced holes 23, thus creating pressure which acts downwardly upon the main plunger valve 13 and seating it against the surface 12. Thus the flow through the main valve is shut-off, effectively preventing the passage of the objectionably hot or scalding water to the plumbing fixture in use. It will be apparent, of course, that the pressure above and below the thermostatic element 27 will be uniformly distributed independently of the by-pass aperture 11 by reason of the normal leakage occurring between the outer periphery of the main valve plunger member 13 and the inner periphery of the sleeve 4, passing through the apertures 23 and around the relieved portions of the means gripping the thermostatic element.

The slot or groove 18a in the seating surface of the auxiliary valve 18 allows for the hot water to subsequently drain from within the valve casing and from the shower riser or other similar fixture. It will be evident then that upon the subsequent entrance of water of a desired temperature the bi-metallic thermostatic element 27 will be inverted (open), assuming the position shown in Fig. 2. The movement of the thermostatic element to the latter mentioned position (open) thus relieves the pressure within the chamber 19 and above the main plunger valve 13 and thereby permits the latter to be lifted from its seat (open) by the relatively slight water pressure which is built up below it within the sleeve.

Obviously, the detailed manner in which the above advantages are accomplished may be varied considerably from the construction shown and described. I desire, therefore, to be limited only to the extent of the appended claims construed in terms established by the prior art.

I claim:

1. In a thermostatically controlled valve, a body having an inlet adjacent the top of the body and an outlet adjacent the bottom thereof, a sleeve-like partition within the said body, an internal annular partition on said body in sealing relation with the sleeve-like partition and the upper chamber formed by said annular partition connecting with the said inlet, and the said internal annular partition having an opening therethrough at a location opposite the inlet, and another internal annular partition on said body below the first said annular partition having the lower extremities of the sleeve-like partition in sealing relation therewith, and the said second lower annular partition having an opening therethrough at a location opposite the opening in the first said annular partition, a hollow plunger main valve and a seat therefor, a vertical baffle between the said second lower annular partition and the said seat, and the said vertical baffle having an opening therein opposite the opening in the said second lower partition, the said hollow plunger main valve being reciprocably movable in said sleeve-like partition, the said sleeve-like partition having an opening in the said inlet, a leaky auxiliary valve within the said hollow plunger main valve, a bimetallic thermostatic diaphragm directly controlling the opening and closing movements of the said leaky auxiliary valve and indirectly controlling the movement of the hollow plunger main valve by relieving the pressure which normally holds the main valve to its seat.

2. In a thermostatically controlled valve, a body having an inlet adjacent the top of the body and an outlet adjacent the bottom thereof, a sleeve-like partition within the said body, an internal annular partition on said body in sealing relation with the said sleeve-like partition and the upper chamber formed by said annular partition connecting with the said inlet, and the said internal annular partition having an opening therethrough at a location opposite the inlet, and another internal annular partition on said body below the first said annular partition having the lower extremities of the sleeve-like partition in sealing relation therewith, and the said second lower annular partition having an opening therethrough at a location opposite the opening in the first said annular partition, a hollow plunger main valve and a seat therefor, a vertical baffle between the said second lower annular partition and the said seat, and the said vertical baffle having an opening therein opposite the opening in the said second lower partition, the said hollow plunger main valve being reciprocably movable in said sleeve-like partition, the said sleeve-like partition having an opening in alignment with the said inlet, a leaky auxiliary valve within the said hollow plunger main valve, a bimetallic thermostatic diaphragm directly controlling the opening and closing movements of the said leaky auxiliary valve and indirectly controlling the movement of the hollow plunger main valve by relieving the pressure which normally holds the main valve to its seat, and the upper edge of the said hollow plunger main valve having an outwardly extending flange, the said flange having openings therethrough, whereby fluid is by-passed from the auxiliary valve and permitted to escape around the hollow plunger main valve.

ROY H. ZINKIL.